United States Patent
Cox

(10) Patent No.: US 9,325,577 B2
(45) Date of Patent: Apr. 26, 2016

(54) AUTOMATED DATA CENTER NETWORK PATCHING SYSTEM

(71) Applicant: Cisco Technology, Inc., San Jose, CA (US)

(72) Inventor: Timothy James Cox, Oak Point, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/657,586

(22) Filed: Mar. 13, 2015

(65) Prior Publication Data

US 2015/0188763 A1    Jul. 2, 2015

Related U.S. Application Data

(63) Continuation of application No. 13/421,738, filed on Mar. 15, 2012, now Pat. No. 8,984,191.

(51) Int. Cl.
*H04Q 1/12* (2006.01)
*H04L 12/24* (2006.01)
*H04Q 1/02* (2006.01)

(52) U.S. Cl.
CPC ........ *H04L 41/0806* (2013.01); *H04L 41/0843* (2013.01); *H04L 41/12* (2013.01); *H04L 41/145* (2013.01); *H04Q 1/13* (2013.01)

(58) Field of Classification Search
CPC ..................... H04L 41/12; H04Q 1/135–1/136
See application file for complete search history.

(56) References Cited

U.S. PATENT DOCUMENTS

| | | | |
|---|---|---|---|
| 7,266,818 B2 | 9/2007 | Pike et al. | |
| 7,411,915 B1 | 8/2008 | Spain et al. | |
| 7,617,302 B1 | 11/2009 | Uniacke et al. | |
| 8,181,229 B2 | 5/2012 | Macauley | |
| 8,306,935 B2 | 11/2012 | Doorhy et al. | |
| 8,588,050 B2 | 11/2013 | Caveney et al. | |
| 8,596,882 B2 | 12/2013 | Smrha et al. | |
| 9,112,789 B2 * | 8/2015 | Anand | H04L 41/145 |
| 9,123,111 B2 * | 9/2015 | Fan | G06T 7/602 |
| 2009/0219830 A1 | 9/2009 | Venner et al. | |
| 2012/0198246 A1 | 8/2012 | German et al. | |

FOREIGN PATENT DOCUMENTS

EP    0 781 880 A1    8/1997

OTHER PUBLICATIONS

"Cable Management Software," in MarketWatch, Processor, Dec. 8, 2006, vol. 28, Issue 49, 4 pages in print issue; http://www.processor.com/editorial/PrntArticle.asp?prnt=1&article+a . . . © 2012 Sandhills Publishing Company, U.S.A. printed Aug. 30, 2012 at 1:33 pm.

(Continued)

*Primary Examiner* — Brian Misiura

(57) ABSTRACT

In one embodiment, a computer implemented method is provided for generating a network patch plan. The method can include selecting at least two devices to be interconnected. The method can include selecting a role for each of the at least two devices. The method can include identifying a patching template. The method can include determining a priority order of available logical ports associated with each of the at least two devices. The method can include generating a patch plan based on the priority order.

20 Claims, 12 Drawing Sheets

(56) References Cited

OTHER PUBLICATIONS

International Search Report and Written Opinion, dated Jun. 10, 2013, pp. 1-10, issued in International Application No. PCT/US2013/030465, International Searching Authority—European Patent Office, Rijswijk, The Netherlands.

Hari Prasanna Srinivasan et al., Driving Database Patch Management with Oracle Enterprise Manager 11g, dated Apr. 2010, pp. 1-22, Oracle Corporation, Redwood Shores, California.

Brocade—"Data Center Fabric—Best Practices Guide: Cabling the Data Center," 35 pgs., Dated 2007.

* cited by examiner

| Patch # | Source Device | | | | | Port # | Target Device | | | | |
|---|---|---|---|---|---|---|---|---|---|---|---|
| | ID | Type | Role | Port Type | | | ID | Type | Role | Port Type | Port # |
| 1 | X | UCS Server Chassis | Server Blade Chassis | Server Blade Chassis A-Side Uplink Port | 1 | Y | 6120 FI Switch | A-Side Access Switch | Server Blade Chassis DownLink Port | First Available DownLink |
| 2 | X | UCS Server Chassis | Server Blade Chassis | Server Blade Chassis A-Side Uplink Port | 2 | Y | 6120 FI Switch | A-Side Access Switch | Server Blade Chassis DownLink Port | First Available DownLink |
| 3 | X | UCS Server Chassis | Server Blade Chassis | Server Blade Chassis A-Side Uplink Port | 3 | Y | 6120 FI Switch | A-Side Access Switch | Server Blade Chassis DownLink Port | First Available DownLink |
| 4 | X | UCS Server Chassis | Server Blade Chassis | Server Blade Chassis A-Side Uplink Port | 4 | Y | 6120 FI Switch | A-Side Access Switch | Server Blade Chassis DownLink Port | First Available DownLink |
| 5 | X | UCS Server Chassis | Server Blade Chassis | Server Blade Chassis B-Side Uplink Port | 1 | Z | 6120 FI Switch | B-Side Access Switch | Server Blade Chassis DownLink Port | First Available DownLink |
| 6 | X | UCS Server Chassis | Server Blade Chassis | Server Blade Chassis B-Side Uplink Port | 2 | Z | 6120 FI Switch | B-Side Access Switch | Server Blade Chassis DownLink Port | First Available DownLink |
| 7 | X | UCS Server Chassis | Server Blade Chassis | Server Blade Chassis B-Side Uplink Port | 3 | Z | 6120 FI Switch | B-Side Access Switch | Server Blade Chassis DownLink Port | First Available DownLink |
| 8 | X | UCS Server Chassis | Server Blade Chassis | Server Blade Chassis B-Side Uplink Port | 4 | Z | 6120 FI Switch | B-Side Access Switch | Server Blade Chassis DownLink Port | First Available DownLink |

FIG. 11

AUTOMATED DATA CENTER NETWORK PATCHING SYSTEM

PRIORITY CLAIM

This application is a continuation of U.S. patent application Ser. No. 13/421,738, filed Mar. 15, 2012, which is incorporated by reference in its entirety

TECHNICAL FIELD

The present invention relates generally to networks and, more particularly, to network patching systems.

BACKGROUND

A data center is a centralized repository for the storage, management, and dissemination of data and information organized around a particular body of knowledge or pertaining to a particular business. A private data center may exist within an organization's facilities or may be maintained as a specialized facility. Organizations worldwide spend billions of dollars annually in managing and administering such data centers.

BRIEF DESCRIPTION OF THE DRAWINGS

FIG. 11 illustrates one example of a table defining the network patches between the three devices.

DETAILED DESCRIPTION OF THE DRAWINGS

Overview

In one embodiment, a patch plan system can include a memory, a processor in communication with the memory, and the memory including computer code executable with the processor. The computer code can be configured to select at least two devices to be interconnected. The computer code can be configured to select a role for each of the at least two devices. The computer code can be configured to identify a patching template. The computer code can be configured to determine a priority order of available ports associated with each of the at least two devices. The computer code can be configured to generate a patch plan based on the priority order.

In another embodiment, a computer implemented method can be for generating a network patch plan. The method can include selecting at least two devices to be interconnected. The method can include selecting a role for each of the at least two devices. The method can include identifying a patching template. The method can include determining a priority order of available logical ports associated with each of the at least two devices. The method can include generating a patch plan based on the priority order.

In yet another embodiment, a tangible computer readable medium can be encoded with computer executable instructions executable with a processor. The computer readable medium can include instructions executable to select at least two devices to be interconnected. The computer readable medium can include instructions executable to select a role for each of the at least two devices. The computer readable medium can include instructions executable to identify a patching template. The computer readable medium can include instructions executable to determine a priority order of available ports associated with each of the at least two devices. The computer readable medium can include instructions executable to generate a patch plan based on the priority order.

Example Embodiments

A patching system is typically used to interconnect various pieces of equipment within a data center. A patch cable or patch cord is an electrical or optical cable used to connect ('patch-in') one electronic or optical device to another for signal routing. Devices of different types (e.g., a switch connected to a computer, or a switch to a router) are connected with patch cords. When patching (i.e., interconnecting) equipment in the data center, the expertise of many domain experts is required (e.g., hosting, network, storage, and backup engineers) to create the physical interconnectivity allowing the physical and logical devices to perform their intended functions. The process of getting these domain experts together to generate patch plans is sometimes lengthy and error prone. Invariably, the patch plan is reworked many times prior to being implemented and, more often than not, significant changes are necessary when implementation does occur.

Figure 1:
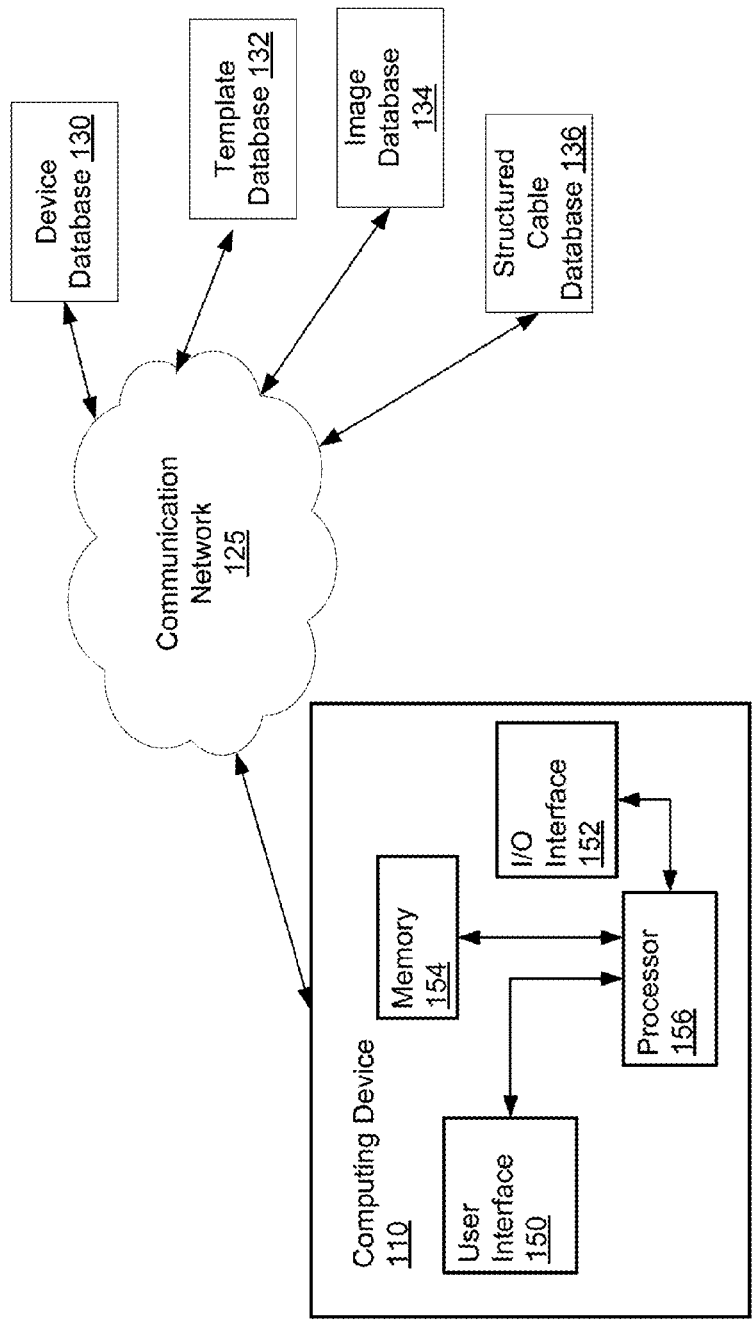
FIG. 1 is one example schematic view of an automated data center network patching system.

FIG. 1 is a schematic view of an automated data center network patching system 100 in accordance with some embodiments. The automated data center network patching system 100 may create network patch plans between physical equipment deployed in the data center and between physical equipment and the data center's structured cabling or infrastructure. In one example, the automated data center network patching system 100 may include a computing device 110, a device database 130, a template database 132, an image database 134, and a structured cable database 136. In other examples, the automated data center network patching system 100 may include any number of databases that include the information described. The various system components described herein may be connected to a communication network 125 in any suitable manner including, for example, any wired or wireless connection using any network connection protocol. In other examples, the various system components may be coupled together by a peer-to-peer communication medium, such as cables, or reside in one or more devices in communication over a dedicated and/or non-dedicated communication path.

The computing device 110 may be any type of computing device capable of establishing a networked connection and/or a peer-to-peer connection and capable of providing display, user interface, and/or input capabilities, as will be described in more detail below. The computing device 110 may be configured as, for example, a server computer, a desktop computer, a personal computer (PC), a laptop computer, a palmtop computer, a handheld computer, a cellular telephone, a personal digital assistant (PDA), a computer workstation, a tablet PC, and the like.

The computing device 110 may include or be in communication with a user interface 150, a processor 156, a memory 154, and/or an input/output (I/O) interface 152. The user interface 150 may include buttons, sliders, knobs, a touch screen, voice recognition, a keyboard, or any other form of interface that allows user commands to be provided to the computing device 110. Additionally, or alternatively, the user interface 150 may include any form of audio and/or visual outputs for receipt by a user of the computing device 110. The audio and/or visual outputs of the user interface 150 may include, for example, a light emitting diode (LED), a meter, a display, such as a liquid crystal display (LCD), or any other mechanism providing indication to a user of the condition and/or operation of the computing device 110.

The processor 156 may be used to run operating system applications, firmware applications, media playback applications, media editing applications, or any other application. In some embodiments, the processor 156 can drive a display and process inputs received from one or more input devices. The processor 156 may include one or more microprocessors, digital signal processors, field programmable gate arrays (FPGA), or any other mechanism or device capable of executing logic and/or processing input and output signals.

The memory 154 may be a volatile and/or a non-volatile memory devices that are configured to store instructions executable by the processor 156. The memory 154 may include a medium that preserves data for retrieval, such as instructions retrieved for execution. The memory 154 may also include a hard disk drive, a compact disc drive, a digital versatile disc drive, a Random Access Memory (RAM), a Read Only Memory (ROM), a Programmable Read-Only Memory (PROM), an Electrically Erasable Programmable Read-Only Memory (EEPROM), a flash memory, or any other digital storage device.

The computing device 110 may communicate with one or more input and/or output devices via the I/O interface 152. The input/output devices may include, for example, a keyboard (e.g., a hard keyboard or a soft keyboard), a mouse (e.g., a trackball, a rollerball, a touchpad, or other pointing device), a stylus or other pen-type input device (e.g., for a tablet PC type computing device), a disk drive, a USB port, a network connection, a joystick type controller, a telephone connection, an Ethernet connection, a voice recognition capability, or any other type of input/output devices. The input/output devices may also include, for example, a fax machine, a printer, a copier, an image and/or video display device (e.g., a television, a monitor, or a projector), an audio output device, or any other type of input/output devices.

The computing device 110 may interact with the device database 130. The device database 130 can be one or more databases and can include, for example, one or more storage mediums including a hard-drive, solid state drive, flash memory, permanent memory such as read-only memory (ROM), any other suitable type of storage component, or any combination thereof. The device database 130 can store, for example, information associated with each device used within the data center such as computers, servers, data communications equipment, and the like.

The computing device 110 may interact with the template database 132. The template database 132 can include, for example, one or more storage mediums including a hard-drive, solid state drive, flash memory, permanent memory such as read-only memory (ROM), any other suitable type of storage component, or any combination thereof. The template database 132 can store, for example, information associated with one or more network patching templates.

The computing device 110 may interact with the image database 134. The image database 134 can include, for example, one or more storage mediums including a hard-drive, solid state drive, flash memory, permanent memory such as read-only memory (ROM), any other suitable type of storage component, or any combination thereof. The image database 132 can store, for example, images associated with one or more devices within the data center 200.

Figure 2:
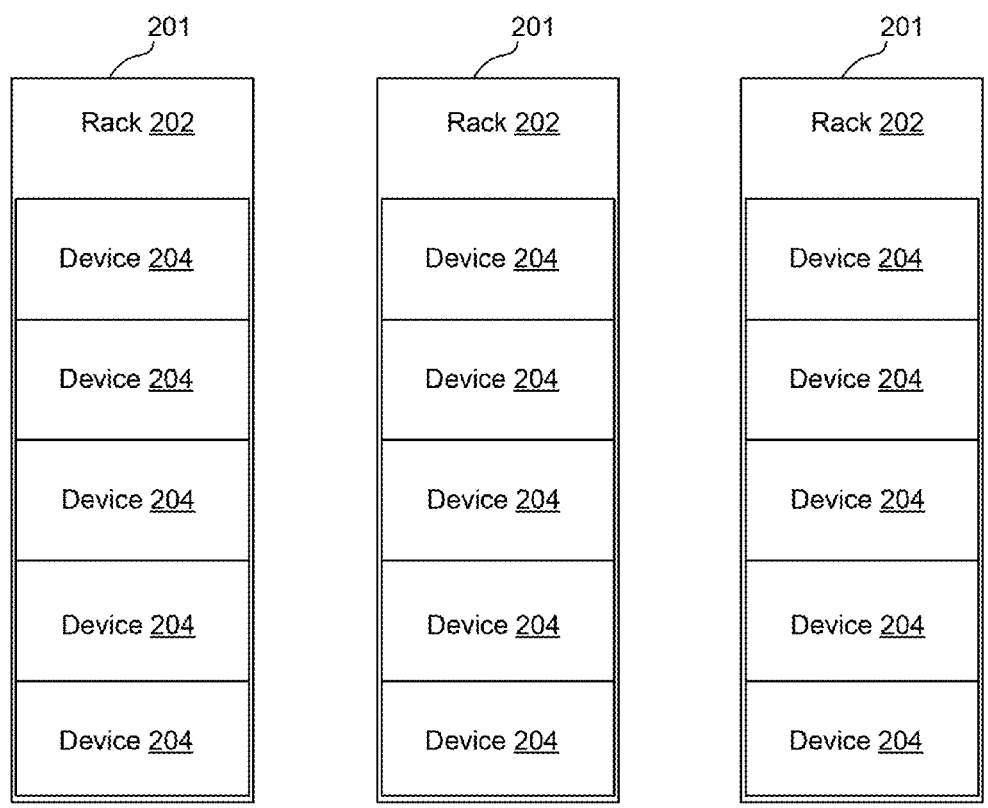
FIG. 2 illustrates an example data center in which the automated data center network patching system may operate.

In the example of FIG. 2, an example data center 200 having racks 202 is depicted in which the automated data center network patching system 100 may operate. The data center 200 may be a facility used for housing devices 204 used within a network such as computers, servers, data communications equipment, and the like. The data center 200 may occupy one or more rooms of a building, one or more floors, or an entire building. In the example of FIG. 1, the data center 200 includes a number of separate cabinets 201. Each of the cabinets 201 may include racks 202 in which devices 204 are mounted. The data center 200 may include any number of cabinets 201, and any number of racks 202. Each rack 202 may include any number of rack cabinet bays. The data center 200 may be implemented in various forms such as, for example, a blade center in which a number of blade servers are installed. In addition to patching devices in cabinets, in some examples, there is a standalone device or standalone devices that are mounted and wired into their own cabinet and the cabinet is patched into the network.

The devices 204 installed in each rack 202 may include rack-mounted servers, routers, switches, power systems, blade server chassis configured with or without blade servers, and any other equipment known to those of skill in the art. Such devices 204 may be installed into cabinet slots of each rack 202 or removed from those cabinet slots at any time for any reason. The devices 204 may also be moved from one cabinet slot to another cabinet slot or from one rack to another rack. Although only a limited number of racks configured with a limited number of network equipment is illustrated in FIG. 2, those skilled in the art will recognize that the data center may include any number of racks configured with any number of network equipment components or devices.

Figure 3:
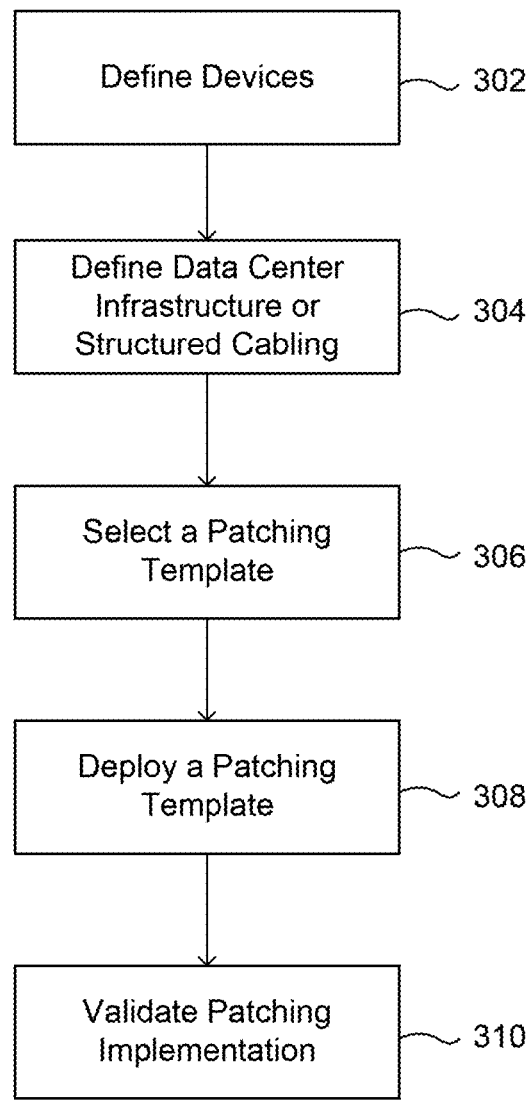
FIG. 3 illustrates a flowchart of one example method for creating a network patch plan.

FIG. 3 is a flowchart of one example method for creating a network patch plan using, for example, the computing device 110 of FIG. 1. A device configuration for each device 204 requiring network connectivity within the data center 200 may be defined at step 302 in order to model the devices. To that end, each device 204 may be modeled to identify the physical ports, the logical ports, the physical port characteristics, the physical port groupings, the logical port characteristics and logical port groupings. The modeling may be based on predefined user selectable models, or may be automated model selections based on parameters associated with the respective device 204, or may be user selected models built and/or customized by the user.

When introducing a device 204 into a representation of the data center 200, a device category may be identified for the device 204. In one example, the user interface 150 may display a graphical user interface (GUI) that enables the user of the interface to view a representation, and interact with at least a portion of the automated data center network patching system 100. The GUI may provide the user with an efficient and user-friendly presentation of data provided by the automated data center network patching system 100. The user interface 150 may include customizable frames or views having interactive fields, pull-down lists, and/or buttons operated by the user.

For example, a GUI device catalog screen may be used to populate or input information relating to the device 204 to define the device configuration and complete the modeling. The GUI device catalog screen may include access to any number of devices that span many data centers. Devices in the catalog may be selected for a given data center installation or upgrade. For example, the device 204 may be selected from a listing of devices in the catalogue. The information in the GUI device catalogue screen relating to the device 204 may be manually input by a user, and/or populated by an automated or semi-automated process, such as using a data import export function. The inputted/populated information relating to the device 204 may be stored in the device database 130. After defining a device category for the new device, the device may be created in the database to be part of the data center 200. In one example, the GUI device catalog screen may include a 'Create' menu item that, when selected, opens a submenu of device categories. The appropriate device category for the device can then be selected. For example, to add a new 6120XP Fabric Interconnect Switch device (available from Cisco Systems, Inc. of San Jose, Calif.), the device category of 'Network' may be selected. In a selected device category, only those devices that fit within the selected device category are available for selection. Thus, a user cannot erroneously select a device that does not fit within the selected device category. The Cisco 6120XP Fabric Interconnect Switch ('6120XP') is an example device which will be used herein for illustrative purposes only and is not intended to be limiting of devices that may be used within the scope of the automated data center network patching system 100.

After the device 204 is created, the user may enter or import the attributes associated with the device 204. In one example, the user interface 150 may show a GUI that enables the user of the interface to manually enter or select the attributes associated with the device 204. For example, a GUI device details screen may be presented with the device's default attributes. At this point, the user may populate, modify and/or add one or more device attributes. For example, the GUI device details screen for the device 204 may have fixed attributes that are there all of the time, and have the ability for users to introduce new attributes. User defined attributes give the users the ability to introduce additional information that will help them manage the facility. The system can associate the user defined attributes to the data center, virtual spaces in which cabinets and equipment can be placed, device types in the device catalogue, and deployed devices in the data center. Accordingly, the list of attributes may include, but is not limited to, the following attributes: 1) name or code identifying the device, 2) a description of the device, 3) the number of rack units consumed by the device, 4) projected power consumption in kW, 5) weight of the device, 6) a role the device will fill within the network, 7) a naming convention representing the device and role combination, 8) images of the device to be viewed in the Device Catalog, and/or 9) front and back images to be viewed when placed in a cabinet.

A single device can be placed in different functional areas in the data center and be configured in a manner so that it functions for a specific role. In the network there are a significant number of roles a single device could fill, depending on where the device is placed and how it is configured. Thus a role a device will fill refers to a description of the functionality of the device within the data center. As an example, a Cisco 7010 Gateway can fill a first role as a DC Gateway, which aggregates traffic sent directly from servers. In a second role, the Cisco 710 Gateway can be configured as a DCC Gateway in which the Cisco 7010 can aggregate traffic from one or more DC Gateways. Accordingly, by defining the role of the device 204 within the attributes, the overall operational functionality of the device is correspondingly defined.

Figure 4:
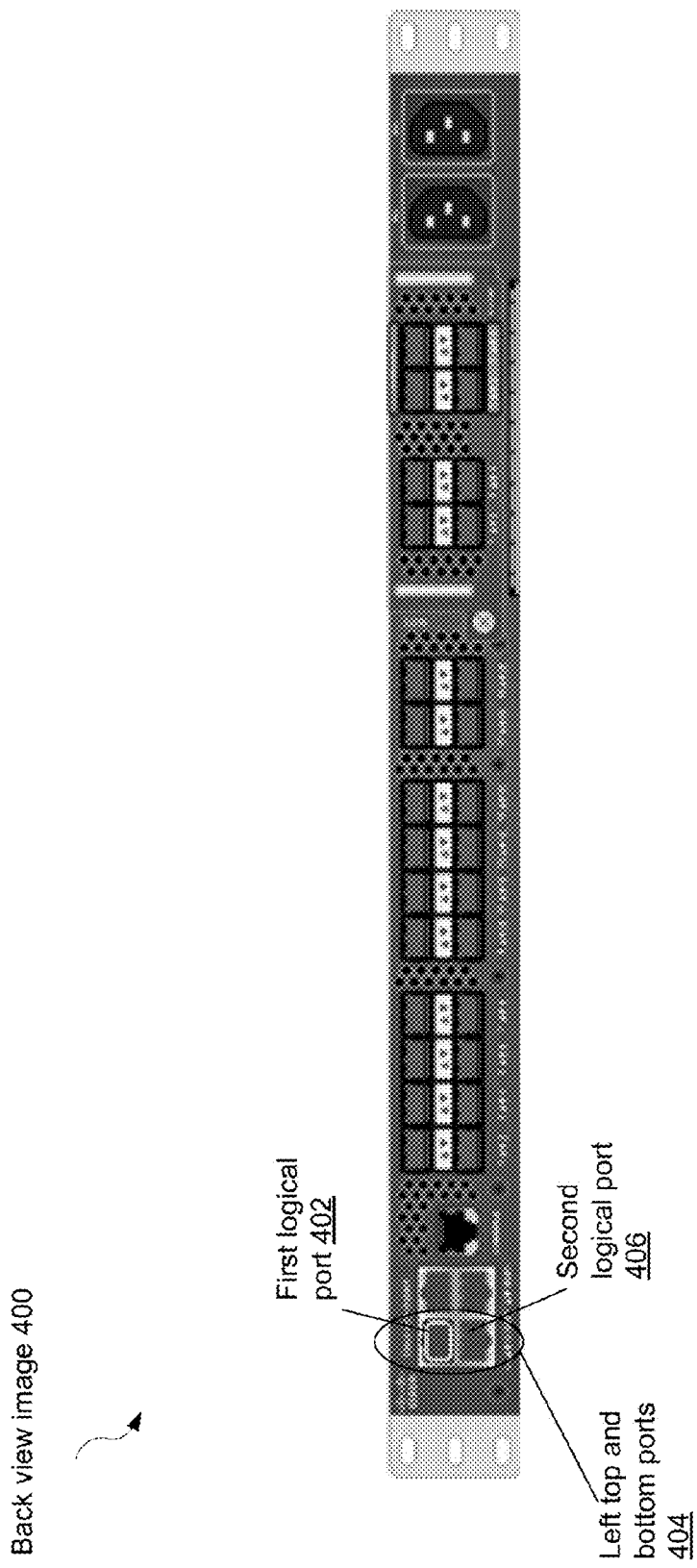
FIG. 4 illustrates a back view image of an example device.

After defining the device, one or more logical ports may be introduced for the device. Each logical port that is defined maps to an actual physical port on the device. In one example, the user interface 150 may show a GUI that enables the user of the interface to introduce one or more logical ports for the device. For example, the GUI device details screen may include a 'Network' tab that, when selected, includes a device 'Back' view option. Selection of the 'Back' view may display an image of the back of the 6120XP device. The image of the back of the 6120XP device depicts the location of the network ports on the respective device. In one example, images of the device 204 may be previously stored in image database 134. When the 'Back' view is selected, computing device 110 may retrieve the appropriate image from image database 134 for display. FIG. 4 is a back view image 400 of the 6120XP device.

In one example, one or more logical ports for the device 204 may be introduced using the back view image 400 to customize the device 204 in the data center 200. For example, two cross-connect logical ports may be created on the top and bottom ports 404 located on the far left side of the device 204 using the back view image 400. In one example, a logical port may be created by right-clicking on the back view image 400 and selecting a 'Create Port' option. Once 'Create Port' is selected the logical port can be seen on the back view image 400. With the logical port visible, the logical port may be moved and/or resized into the appropriate location on the image. For example, the first logical port 402 may be moved to the far left top cross-connect port and sized appropriately as shown in FIG. 4. In other examples, one or more logical ports may be introduced by any other means.

The attributes for first logical port 402 may be configured. In one example, the user interface 150 may show a GUI that enables the user of the interface to enter, or populate, or modify defaults of the attributes associated with one or more logical ports. For example, a port's attributes can be configured by right-clicking on the port and viewing the logical port's details. Attributes types for the first logical port 402 may include, but are not limited to, a code or name, a description, a port type, a link type, a priority, and a connection. Thus, example defaults attributes may include the next logical unused attribute in a sequence, such as a code or name, a priority, or a connection in the data center 200 for the type of device 204. In addition, default attributes may include, the default description based on the identified type of the device, or any other attribute that may be logically determined by the system. In addition or alternatively, after a port is fully defined it can be cloned or copied . . . in this fashion the user need not populate every attribute for every port the user creates. It is possible to clone one or more ports at a time and then move the one or more clone ports to the proper location on the device.

A port type may be associated with the first logical port 402. In one example, a GUI port type screen may present a list of potential port types to select from. If the desired port type is not in the list, a new port type may be created. For example, a 'Management' option may be selected on the GUI device catalog screen. After selecting the 'Management' option, a 'Network' sub-menu may be selected which displays a 'Port Types' menu item. The 'Port Types' menu item selection may cause a 'Network Port Types' dialog box to be displayed. It is within this 'Network Port Types' view that new port types can be introduced. New port type can be introduced manually by a user, imported, or generated in an automated fashion by the system based on the attributes and other information related to the device. In one example, a port type name, description, and the type of patch cord to associate with the port type may be specified using the GUI port type screen when adding a new port type. Example descriptions include, but are not limited to, ethernet port, coax port, console port, management port, fiber channel port, and xlink port. Example patch cord types include, but are not limited to, copper and fiber. Using the 6120XP device example, a port type named 'RJ-45' with a description of 'ethernet port' requiring a copper patch cord is added as a new port type. With the desired port type now created, the 'RJ-45' port type may be selected for the first logical port 402. The system may monitor for situations where a patch cord connector for a specified patch cord will not mechanically mate with a device's port connector, and deny a user the ability to create the patch, such as by displaying an error message.

A link type may be selected for first logical port 402. Link types may be used to create rules that define valid patches between two devices. For the 6120XP device scenario, a 'cross-connect' link type that can patch only to other 'cross-connect' link types may be created. In one example, the user interface 150 may show a GUI that enables the user of the interface to select a link type for one or more logical ports. For example, a new link type may be created using a choosing 'Link Types' option on the GUI device catalog screen. A new link type may be introduced. When the new 'cross-connect' link type is introduced, other valid link types that the 'cross-connect' link type can connect to (i.e., compatible link types) may be specified. Compatibility of link types may be predetermined within the system, such as by being pre-specified by a user. For example, compatible link types may be selected to ensure a network patch from a cross-connect link can only span between two cross-connect link type ports. To that end, the logical port details may be updated such that the link type of 'cross-connect' is the only compatible link type.

Referring back to FIG. 4, a second logical port 406 may be created. In one example, the first logical port 402 may be copied, pasted, and positioned over the far left bottom port location on the back view image 400. Using the copy/paste process, the second logical port 406 inherited the attribute settings of the first logical port 402. In one example, the attribute settings for the second logical port 406 may be updated if different than the attribute settings for the first logical port 402. Using the copy/paste process, the second logical port 406 inherited the attribute settings of the first logical port 402. In one example, the code or name of each logical port must be unique. To that end, an asterisk or other identifier is shown notifying the user that a duplicate name or code is being used for one or more logical ports within the device 204.

Only two logical ports have been named in this example. However, at times many more logical ports may need to be named at one time. To that end, an auto-naming process may be used to assign a name to many logical ports at one time. To begin the auto-naming process, all logical ports to be named are selected. In one example, all logical ports to be named may be selected by lassoing the ports using a mouse. In a second example, all logical ports to be named are selected using a control-clicking combination with a mouse on each logical port. In other examples, other means for selecting multiple logical ports to be named may be used.

In one example, after the desired logical ports are selected, the user may select an auto-name menu item. A naming format may be defined when auto naming ports. For example, a naming format may be defined by adding a '#' sign which may be replaced by a unique logical port number after a logical port name moniker is provided. In one example, the auto-naming process may provide the option to execute the naming execution in a vertical or horizontal fashion to support a specific equipment vendor's port numbering convention. In addition, padding can be added to the port name to ensure alphabetical sorting can be executed on the port names. After the auto naming process has completed, each port may be viewed to ensure the logical port names have been updated as expected.

Figure 5:
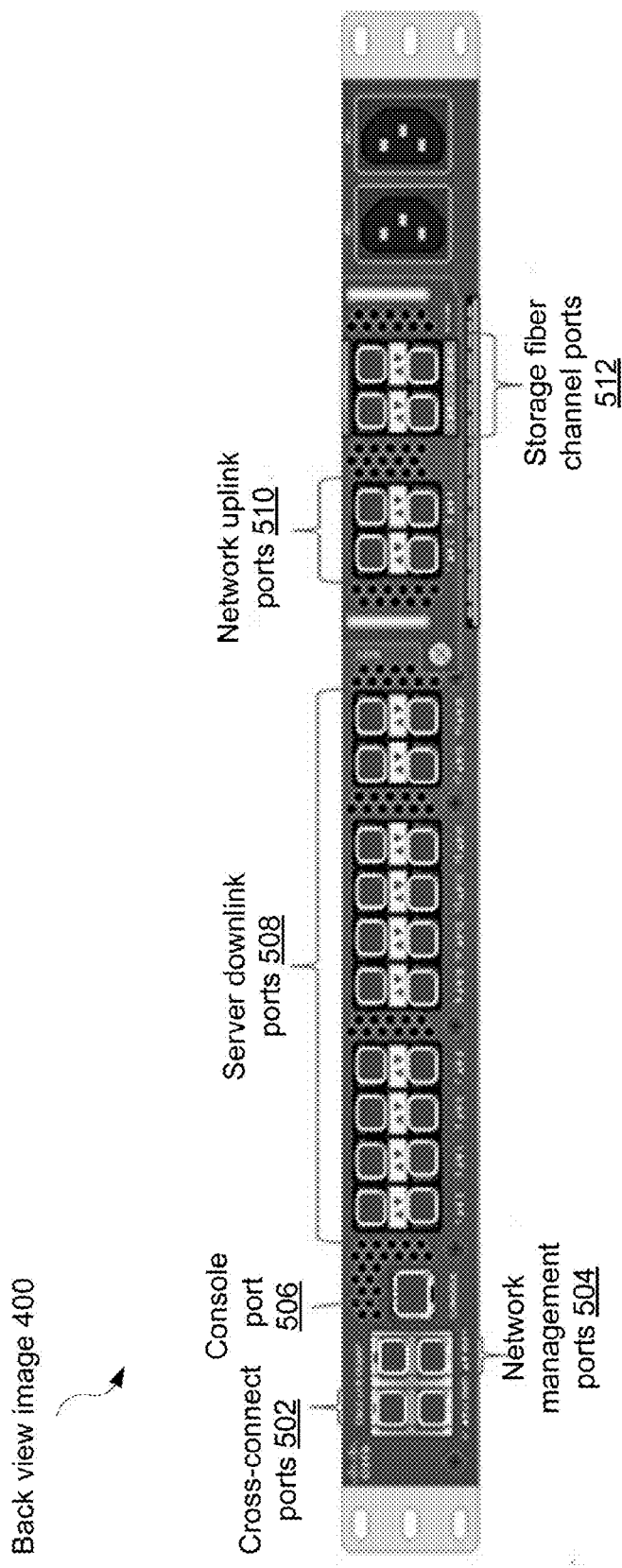
FIG. 5 illustrates the back view image of an example device will all logical ports populated.

FIG. 5 illustrates an example of the back view image 400 of the 6120XP device with all logical ports populated. Population of the logical ports may be performed manually, by copying or in an automated fashion by the system using the attributes and other details of the devices. As an example, in FIG. 5, twenty server downlink ports 508 are shown. During population of the server downlink ports 508, the four ports on the far left side (two on the first row and the two on the bottom row) may be manually created by a user. These four ports may then be selected, and all four ports may be cloned or copied as a group, or individually. Once the group of four ports is copied, the group of four ports can be pasted onto the device, and moved in concert to the desired location. This copy and paste process may be repeated to populate the remaining downlink ports.

The logical ports may be defined in groups. In this example, the logical port groups include cross-connect ports 502, network management ports 504, console port 506, server downlink ports 508, network uplink ports 510, and storage fiber channel ports 512.

The priority order defining how the order in which the logical ports are to be consumed within each logical port group may be defined. In one example, the user interface 150 may show a GUI that enables the user of the interface to enter the priorities associated with one or more logical ports. For example, a GUI logical port details screen may be used to define the priorities within the group of server downlink ports 508. In this example, a priority for each logical port within the server downlink ports group may be defined. The port priority may be used to allocate unused ports when generating the patch plan. In one example, an orange halo surrounds each consumed port. In other examples, consumed ports may be identified in another way. The same process may be used to define priorities for each of the remaining logical port groups. In one example, the priorities may be automatically assigned by the automated data center network patching system 100. In a second example, the automated data center network patching system 100 may confirm a priority defined by a user is valid before the patch plan is created and generated using the priorities.

Figure 6:
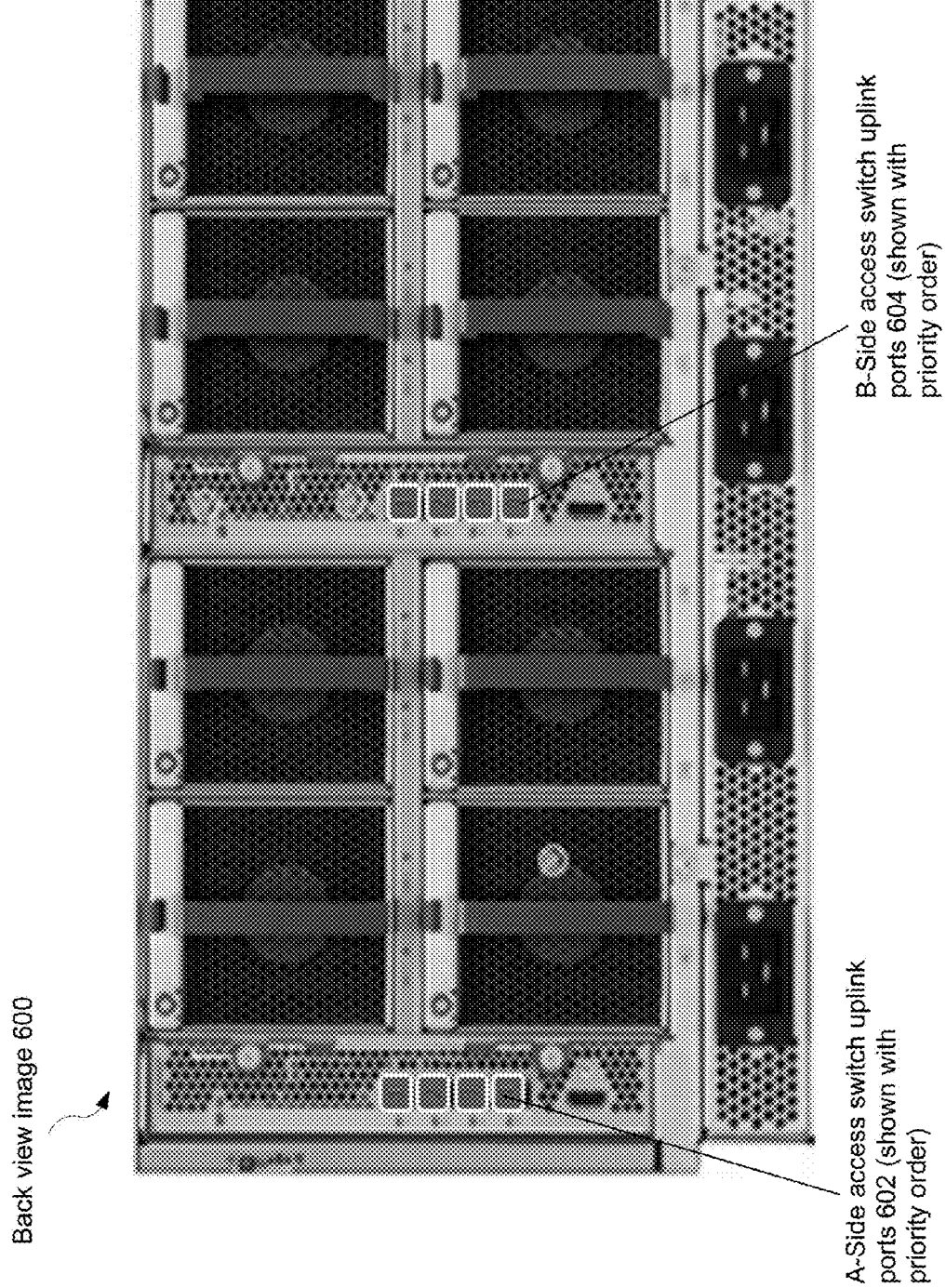
FIG. 6 illustrates a back view image of an example second device.

FIG. 6 illustrates an example of a back view image 600 of another device 204 that is a Unified Computing Systems (UCS) Server Chassis device. In this example device configuration, the logical ports are divided into two logical port groups: A-Side access switch uplink ports 602 and B-Side access switch uplink ports 604. A-Side access switch uplink ports 602 and B-Side access switch uplink ports 604 are shown with the priority order for each logical port displayed on the image.

The data center infrastructure or structured cabling may be defined at step 304. When the data center facility is constructed, its structured cabling may be built out in its entirety. The structured cabling in the structured cable database 136 may define how the cabling is run between floor boxes, patch panels and other devices within the data center.

Figure 7:
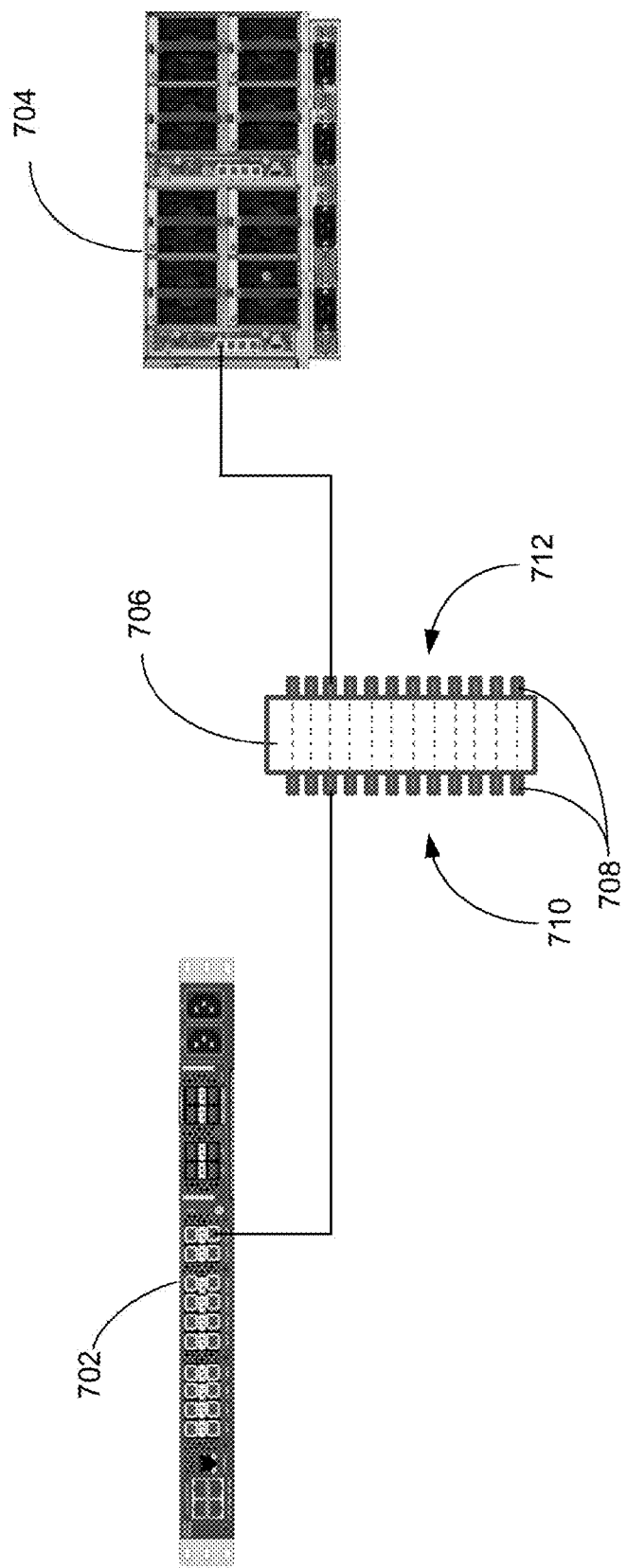
FIG. 7 illustrates an example interconnection diagram that includes a patch panel.
Figure 8:
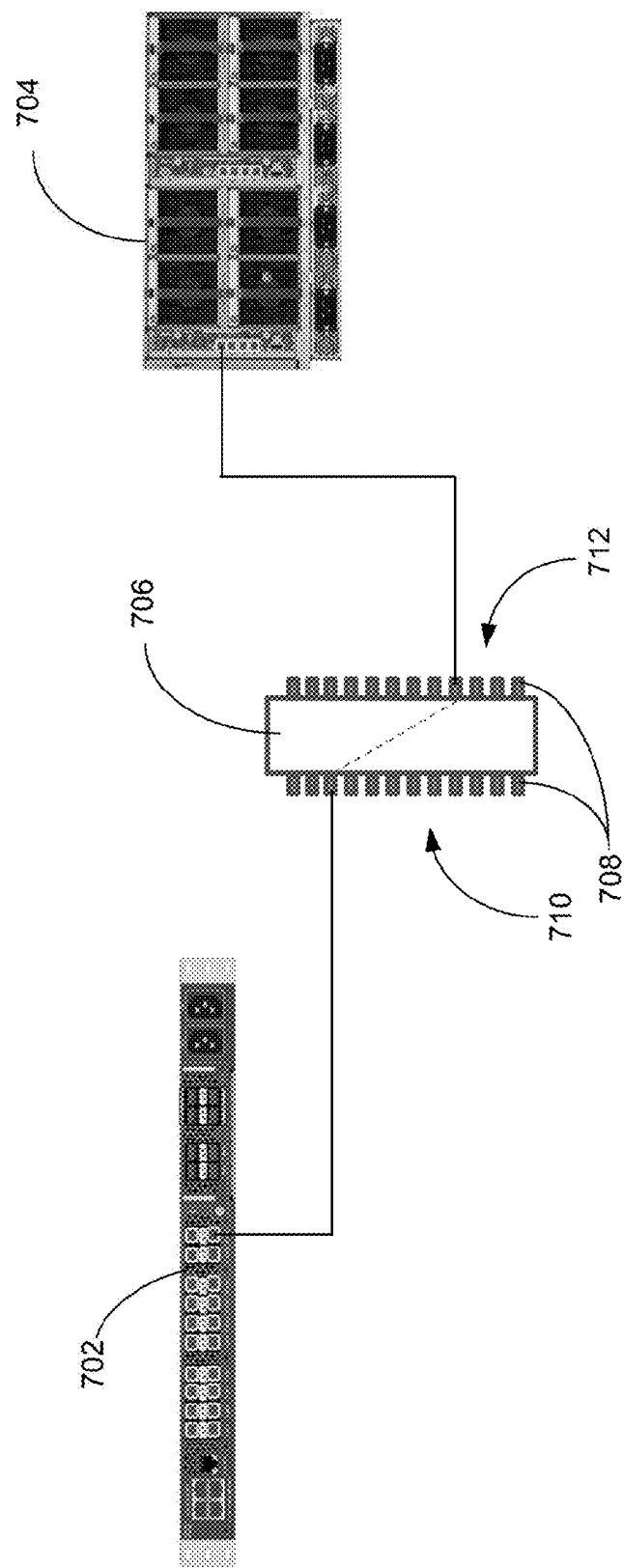
FIG. 8 illustrates another example interconnection diagram that includes a patch panel.

FIG. 7 is an example of a first device 702 coupled to a second device 704 via a patch panel 706. The patch panel 706 is illustrated from a top view and may include ports 708 on a first panel 710, such as a front side panel, of the device that are mapped to ports 708 on a second side panel 712, such as a back side panel of the same device. Mapping may be to ports 708 in corresponding port locations on the patch panel 706, as illustrated in FIG. 7. Alternatively, or in addition, ports 708 on the first side 710 may be mapped to any other ports on the second side 712, as illustrated in the example of FIG. 8.

In an example system with multiple cabinets and multiple patch panels, ports 708 on the back side panel 712 of a first patch panel can have structured cabling plugged into them that run to the back side panel 712 of a second patch panel. Based on the mapping of the respective first and second patch panels, for example, a network patch that connects to the front side of a port on device A can be seen on the front side of device B. The ports on the front side panel and the back side panel can be associated or mapped in any configuration, such as FIG. 8 where a front side port 710 is mapped to a back side port 712 in a different location.

Figure 9:
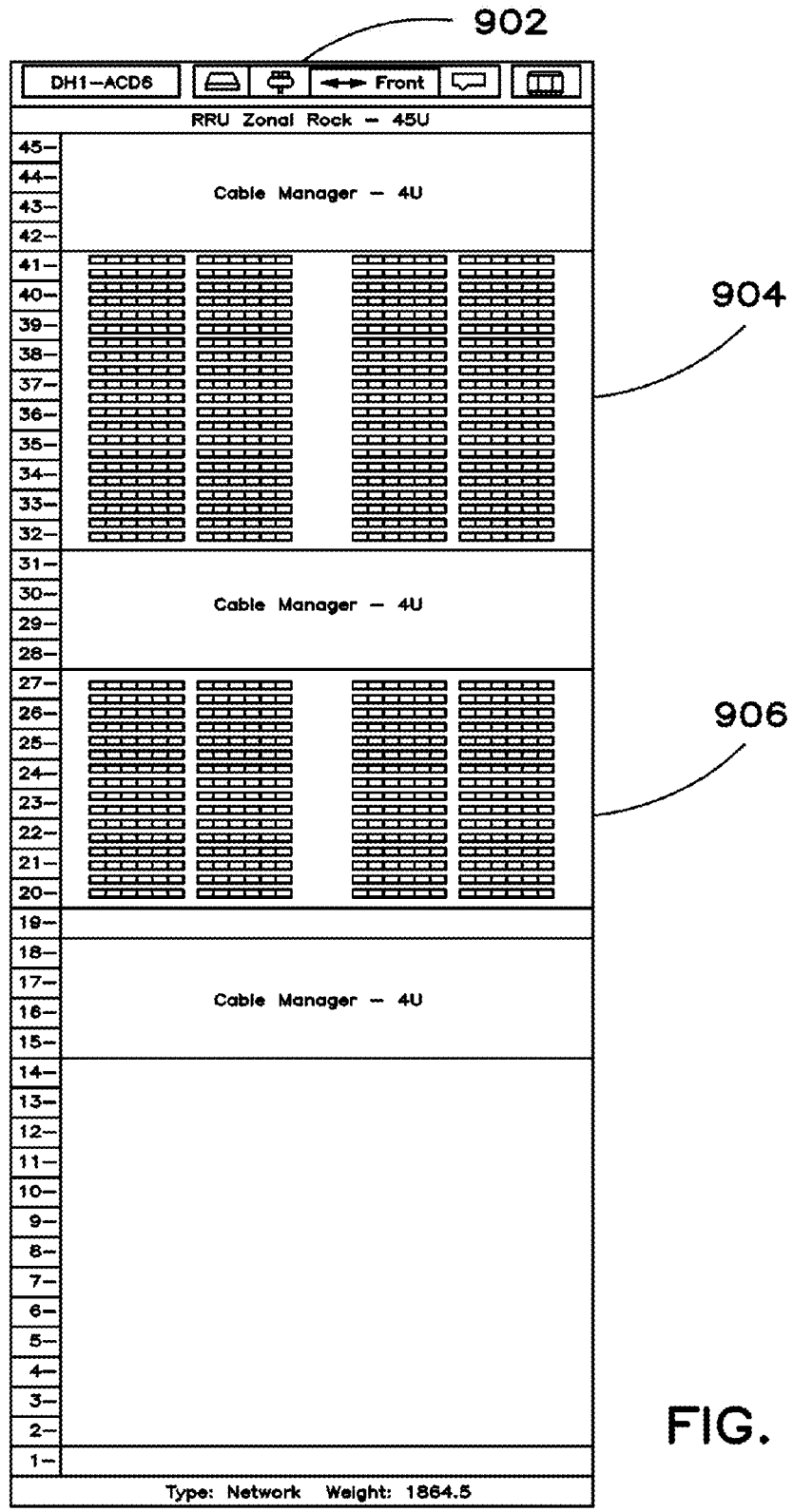
FIG. 9 illustrates an example of a cabinet having patch panels.

The patch panels may be located in a cabinet, such as the example cabinet 902 of FIG. 9, which is shown in a front view. In this example, the cabinet 902 includes two patch panels. A first patch panel 904 vertically stacked in the cabinet 902 above a second patch panel 906. In other examples, any number of patch panels may be included in cabinet 902.

The infrastructure may define the physical connectivity paths that data packets traverse to get from one device to another within the facility. The structured cabling may include any number of subsystems that include demarcation points, equipment or telecommunication rooms, vertical or riser cabling, horizontal wiring, work area components and patch panels. The physical cabling paths and their mechanical connection types may be captured to ensure specific network patches can physically be run between a device and the structured cabling and another device. The physical cabling paths and corresponding mechanical connection types may be user entered in the structured cable database 136. Alternatively, or in addition, in a situation where the patch panels are intelligent, such as being network communication capable, the patch panels may discover and confirm how the structured cabling is configured. To implement the data center structured cabling, the physical cabling (e.g., copper, fiber runs, single strand, hydra cables) may be introduced into the automated data center network patching system 100. In one example, multiple runs of the structured cabling may be defined at one time. A cable run patching template of the cable runs may be defined which can be used to deploy the same types of cable runs in a modular fashion at other areas within the data center. In some data centers, redundant infrastructure may be deployed. The modularity of the patching template provides consistent deployment in an accelerated fashion.

A device to device patching template for interconnecting two or more devices 204 may be selected at step 306. With the devices modeled and the facilities structured cabling in place, devices may be selected for association with the patching templates to provide device specific interconnection details in a patching plan. A patching template previously created by an SME may be used to generate a specific patch plan. Each patching template that is created identifies two or more devices, the role each device will fill, and how the ports on the devices are interconnected. In one example, the patch plan may be a work product handed to one or more individuals executing racking, stacking and patching of devices into the data center's network. The patch plan may provide a worker the necessary instructions to interconnect a device, either directly to another device or into the data center's structured cabling which will eventually terminate into another device. The patching template allows non-subject matter experts to create patch plans by utilizing a patching template created by subject matter experts. A subject matter expert (SME) may be a person adept in one or more domains related to the data center 200. For example, a SME may include an expert in hosting, network, storage backup, or the like.

Figure 10:
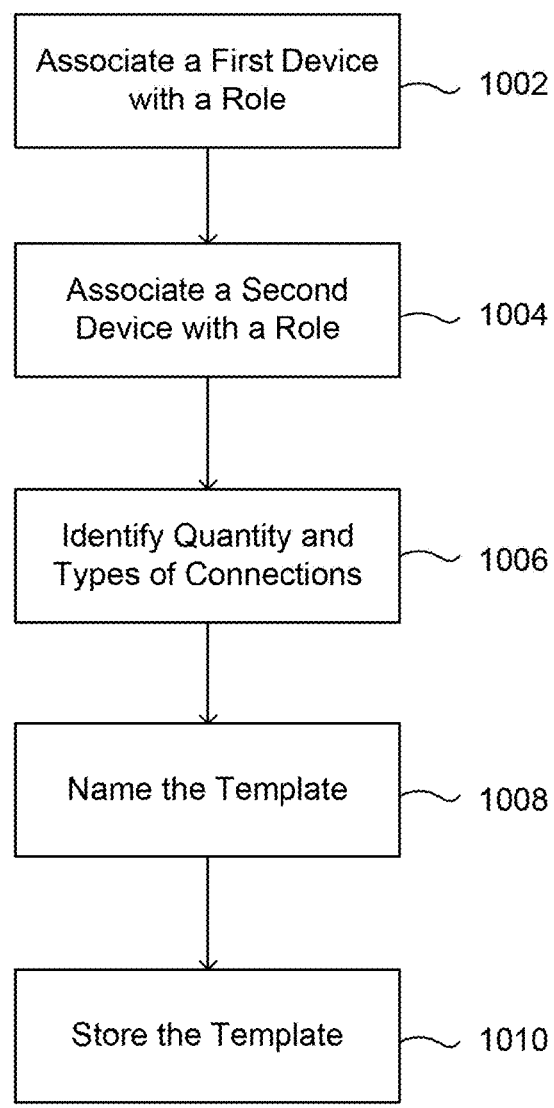
FIG. 10 illustrates a flow diagram of one example method for creating an intra-cabinet patching template.

FIG. 10 illustrates a flow diagram of the steps involved to create intra-cabinet patching using a template. A patching template may be used to identify two or more devices, the role each device will fill, and how the ports on the devices are to be interconnected. The associated role may be the actual role the device will fill within the data center 200. A role may be associated with a defined device at step 1002. In one example, the user interface 150 may show a GUI that enables the user of the interface to associate one or more roles with one or more defined devices. In a second example, one or more roles may be associated with one or more defined devices automatically by the automated data center network patching system 100. For example, a UCS chassis device can be associated with a 'hosting' role. A role may be assigned to a second device representing the role the device will fill within the data center at step 1004. For example, a 6120XP Fabric Interconnect Switch can fill the role of 'Network Access'. The quantity and types of connections required to interconnect the two devices may be defined at step 1006. The types of connections will utilize the device models previously defined (i.e., the logical and physical port characteristics and groupings). The characteristics and groupings are used to ensure mechanical compatibility as well as logical compatibility interconnectivity as defined by an SME. A single device type can fill more than one role within the data center 200. Therefore, it is important to note that the patch template is created for an association of a device type to a specific role being filled. Accordingly, for any given device type, there may be multiple different patch templates created and included in the automated data center network patching system 100, depending on the number of specific roles that the respective device may fulfill within a data center. The patching template may be named at step 1008. The patching template may be stored at step 1010. In one example, the patching template may be stored in the template database 132.

Use of an example patching template will be described that defines how a single UCS Chassis is connected to two 6120 Fabric Interconnect switches via network patches. FIG. 11 illustrates one example of a table defining the network patching template between the three devices. Each row in the table of FIG. 11 may represent a patch, while the column can provide information about the patch at the source and target device. The source device may define down to a specific port how the source device will be network patched to the target device, while the target device may define down to specific port groups. In one example, the patching template may define the first available port in the port group that should be selected when the patching template is generated.

One or more subject matter experts (SME) may create one or more patching templates which define how data centers networks may be patched. In one example, one or more non-subject matter experts can then utilize the patching templates to create an actual patch plan for a specific data center. In a second example, one or more subject matter experts may utilize the patching templates. In other examples, both SMEs and non-SMEs may utilize the patching templates to create data center specific patch plans. The patch plan can be given to the resources responsible for racking, stacking and patching the equipment into the data center.

With the patching template defined, a user (e.g., non-subject matter expert or SME) can select the devices to be interconnected by identifying the devices, and the roles they are filling. Based on the selected devices and the patching template, a patch plan can be generated that could have any number of patch cords defined between the selected devices at step 308. In one example, the user may identify the patching template to be used. In a second example, the patching template may be automatically identified based on each device and the respective role each device is filling. In a third example, a list of patching templates which can be used to create an appropriate patch plan may be presented to the user and the user may select the desired template to be used.

In order to deploy an existing patching template, at least two devices must be selected. The user may then select to create the patch plan. In one example, the user interface 150 may generate a GUI that enables the user of the interface to create the patch plan. For example, the user may click a button on the GUI screen to create the patch plan. In other examples, another type of command may be executed to create the patch plan. Deploying a patching template may take one of two forms: intra-cabinet patching or inter-cabinet patching.

Intra-cabinet patching involves interconnecting two or more devices within a single cabinet. In one example, two devices within a single cabinet are selected. The defined patching template for the two devices may be identified. With a patching template identified, the automated data center network patching system 100 may determine which logical port groups between the devices require connectivity and how many patches are needed to implement the defined patching template. The patching template identifies the priority order in which the port(s) within the logical port group(s) may be consumed. The automated data center network patching system 100 determines which ports are already consumed within the logical port groups and the defined priority order. Based on this determination, the next available port within the groups may be identified and consumed. The patch plan can then be created by the automated data center network patching system 100.

In addition, in intra-cabinet patching, the length of the patch cords connecting two devices in the same cabinet may be determined with the automated data center network patching system 100. For intra cabinet patching the rack unit within the cabinet for each device is known, hence the distance between the two ports being patched. Thus, the length of the patch cords may be determined.

Inter-cabinet patching involves interconnecting two or more devices in which at least two of the devices are located in different cabinets. For example, two devices located within different cabinets may be selected. The defined patching template may be identified by the automated data center network patching system 100. In addition to identifying the patching template, the data center's structured cabling may be traversed by the automated data center network patching system 100 to determine potential physical cabling paths between the two devices and list the potential paths. In one example, the potential cabling paths may be listed by the automated data center network patching system 100 as a number of hops and a distance. The cabling path to be used may be selected by the user from the list of potential paths. In a second example, the cabling path to be used may be automatically selected by the automated data center network patching system 100.

Since the locations of each cabinet is known, the scale of the floor plan is known, and the cabling path is selected, the automated data center network patching system 100 may determine the length of cable to purchase for the patch cords running from a first cabinet to a second cabinet which can be many cabinet spaces away from the first cabinet. If a cabling path cannot be identified by the automated data center network patching system 100, a user notification may be generated. For example, a message stating that additional structured cabling is needed at the facility in order to implement the physical path may be displayed to the user. Any number of patch cords may be needed to connect the devices when performing inter-cabinet patching.

With a patching template identified and structured cabling path selected, the automated data center network patching system 100 may determine which logical port groups between the devices require connectivity and how many patches are needed to implement the defined template. The defined patching template identifies the priority order in which the ports within the logical port groups may be consumed. Based on past port consumption within the logical port groups and the defined priority order, the next available port(s) within the logical port group(s) can be identified and consumed. The patch plan can then be created.

Figure 12:
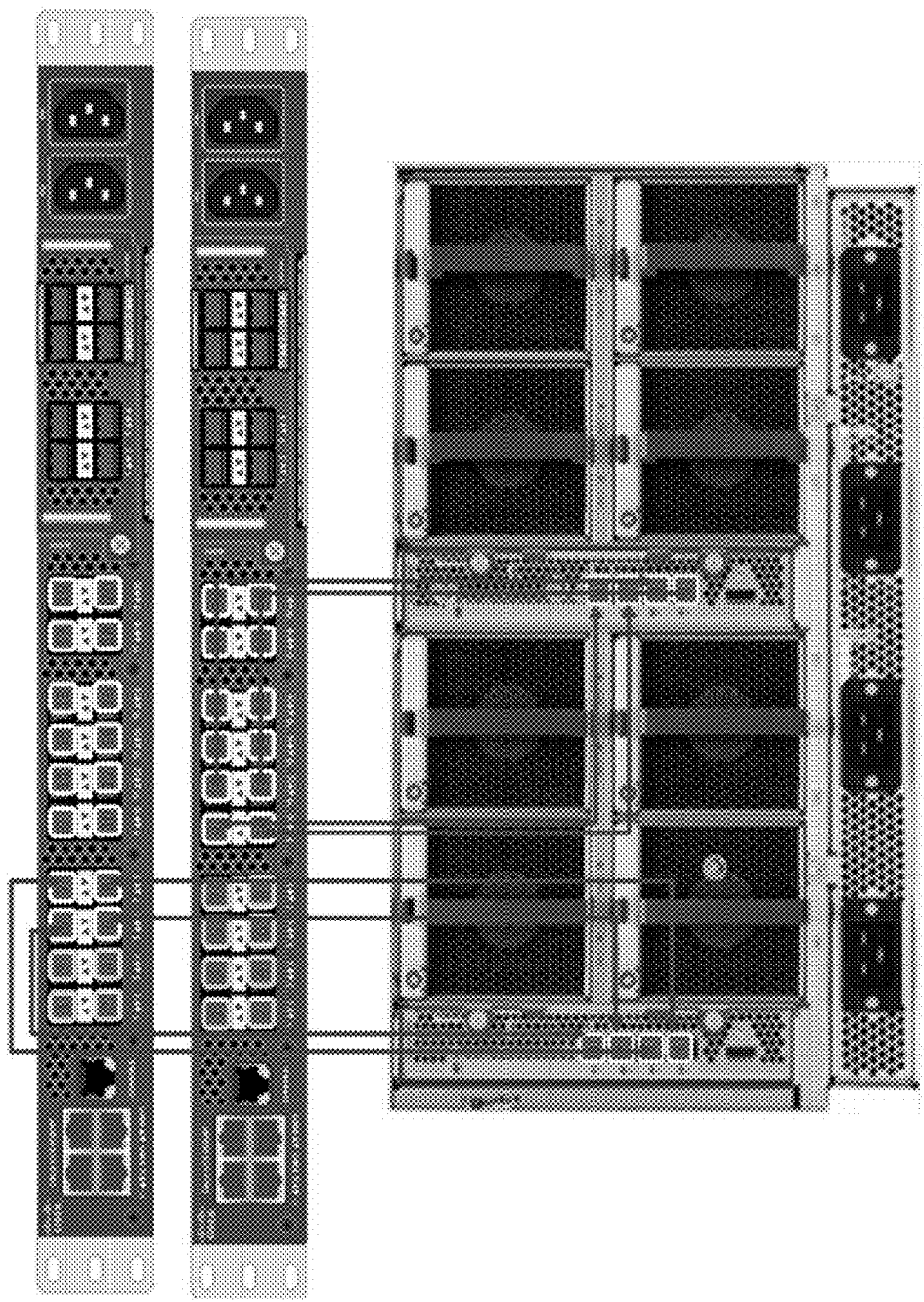
FIG. 12 illustrates one example of network patching interconnecting the three devices.

FIG. 12 illustrates one example of network patching connecting three devices. In the example, three example devices are selected to be patched together. The patching template associated with FIG. 11 may be identified as the patching template to be used to connect the three devices. The first of the three devices is the 'UCS Server Chassis' which will be used in each row of the patching template and identified with 'Source Device ID 1'. Note that none of the Uplink ports have been consumed. Therefore, all source ports are available to fill the Source Device ports. The second of the three devices will be a 6120 FI Switch filling the role of 'A-side server access switch' and identified by 'Target Device ID 1'. Note that four of the Server Blade Chassis Downlink ports have already been consumed and cannot be used when creating additional network patches. In this example, a halo surrounds each consumed port. The third of the three devices will be another 6120 FI Switch filling the role of 'B-Side server access switch' and identified by 'Target Device ID 2'. Note that eight of the Server Blade Chassis Downlink ports have already been consumed and cannot be used when creating additional network patches.

With the physical devices described, the patching template may be populated. The Source Device ID 'X' is replaced with '1' to identify the described UCS Chassis seen in FIG. 12. The first four rows have had their Target IDs changed from 'Y' to '1' to identify the first 6120 FI Switch. The last four rows have had their Target IDs changed from 'Z' to '2' to identify the second 6120 FI Switch.

The first four rows of Target Device Port numbers are populated with the first four available ports from Target Device ID 1's Server Blade Chassis Downlink Port group. The first available are ports 5 through 8. The last four row Target Device Port numbers are populated with the first four available ports from Target Device ID 2's Server Blade Chassis Downlink Port group. The first available ports are ports 9 through 12. FIG. 11 depicts how the three devices should be network patched. A patch plan is created including the necessary instructions to interconnect the three devices. In one example, the patch plan may include written instructions detailing the specific port connections and all patch cords to be used. In a second example, the patch plan may include an image depicting how the devices are to be interconnected. In other examples, both may be provided.

In one example, automated data center network patching system 100 may validate the network patching implementation at step 310. After a patch plan is implemented, automated validation of device interconnectivity may be executed to ensure the racking, stacking and patching activities have been performed in a manner consistent with the planned implementation. To that end, actual connectivity information may be retrieved. For example, configuration tables within the various devices may be retrieved to determine if the ports defined within the patch plan are actually communicating with each other.

In one example, this may be accomplished by piggybacking on existing traffic flows between the devices by snooping. In a second example, a known communication stream is injected between each pair of devices to validate the packet sent is received at the expected device and port.

In some examples, the identity of the user may be verified prior to allowing the user to perform certain functions (e.g., patch plan validation). For example, each user may be required to log in with a username and/or password. An administrator may grant appropriate levels of access to each user.

While the computer-readable medium is shown to be a single medium, the term 'computer-readable medium' may include a single medium or multiple media, such as a centralized or distributed database, and/or associated caches and servers that store one or more sets of instructions. The term 'computer-readable medium' may also include any medium that is capable of storing, encoding or carrying a set of instructions for execution by a processor or that cause a computer system to perform any one or more of the methods or operations disclosed. The 'computer-readable medium' may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system comprising:
a memory; and
a processor in communication with the memory, the memory including computer code executable with the processor, wherein the memory comprises:
instructions executable by the processor to receive identification of at least two devices to be interconnected;
instructions executable by the processor to retrieve a role for each of the at least two devices based on the received identification;
instructions executable with the processor to identify a network patching template for use with the identified at least two devices;
instructions executable by the processor to determine a grouping of available device ports associated with the at least two devices; and
instructions executable by the processor to generate a patch plan to interconnect the at least two devices in a network based on the network patching template and the determined grouping of available device ports.

2. The system of claim 1, wherein the memory further comprises instructions executable by the process to determine a priority order of assignment of the available device ports within each determined grouping, and instructions executable by the processor to select a highest priority available device port from within a respective grouping to use in an interconnection.

3. The system of claim 1, wherein the instructions executable by the processor to determine the grouping of available device ports comprise instructions executable by the processor to identify and group similar and available device ports on the at least two devices.

4. The system of claim 1, wherein the device ports comprise physical ports mapped to logical ports, and wherein the instructions executable by the processor to determine the grouping of available device ports comprise instructions executable by the processor to define the logical ports in groups, and instructions executable by the processor to associate similarly defined logical ports in different devices in a same group.

5. The system of claim 1, wherein the instructions executable by the processor to determine the grouping of available device ports comprise instructions executable by the processor to prioritize the device ports within a determined grouping according to a priority order indicative of an order in which the device ports in the determined grouping are selected by the processor for inclusion in the patch plan.

6. The system of claim 5, wherein the instructions executable by the processor to determine the grouping of available device ports comprise instructions executable by the processor to allocate in the patch plan the prioritized device ports in the determined grouping according to the priority order.

7. The system of claim 1, wherein the instructions executable by the processor to determine the grouping of available device ports comprise instructions executable by the processor to visually identify, in a user interface, device ports that are consumed by interconnections indicated within the patch plan, and device ports that are available for use in the patch plan.

8. The system of claim 1, wherein the instructions executable by the processor to determine the grouping of available device ports comprise instructions executable by the processor to prioritize the device ports within one of a priority of determined groups using a priority order, and wherein the instructions executable by the processor to generate the patch plan are based on the patching template and the determined grouping of available device ports and comprise instructions executable by the processor to allocate unused device ports in the patch plan in accordance with the priority order.

9. The system of claim 1, wherein the instructions executable by the processor to identify the patching template for use with the identified at least two devices comprise instructions executable by the processor to select one of a plurality of predetermined patching templates based on the role of each of the at least two devices.

10. A method, comprising:
retrieving, with a processor, at least two devices to be interconnected, the at least two devices defined in a database;
retrieving a role of each of the at least two devices with the processor, the role of each of the at least two devices being stored in the database;
identifying one of a plurality of predetermined patching templates with the processor based on the retrieved role of each of the at least two devices;
grouping device ports associated with each of the at least two devices in a predetermined group with the processor; and
generating a patch plan with the processor for the at least two devices based on the identified one of the predetermined patching templates and the device ports grouped in the predetermined group.

11. The method of claim 10, further comprising an initial step of the processor defining the at least two devices by populating device configuration information in the database, the device configuration information comprising attributes of each of the at least two devices that include a unique identifier, a port type of the device ports, and a user defined attribute.

12. The method of claim 10, wherein the role comprises a plurality of predetermined roles, and the method further comprises an initial step of the processor assigning a first predetermined role to one of the at least two devices, and a second predetermined role to another of the at least two devices, the first role and the second role being respectively assigned based on a plurality of attributes included in the database that are descriptive of a functionality of each of the at least two devices.

13. The method of claim 10, further comprising the processor auto naming each of the device ports to assign a unique name to each of the device ports in a predetermined naming format.

14. The method of claim 10, wherein each of the device ports include a logical port, and the method further comprises determining a priority order of available logical ports associated with each of the at least two devices, wherein the available logical ports associated with each of the at least two devices are identified by a determination of ports on the at least two devices that are not being consumed.

15. The method of claim 10, further comprising the processor retrieving from the database and displaying an image of each of the at least two devices, each image of the at least two devices displaying a location of the device ports on a respective device.

16. The method of claim 15, further comprising the processor changing a location or a size of the at least one of the device ports within an image in response to receipt of a user input signal, the patch plan comprising the image illustrating how to interconnect the at least two devices.

17. A system comprising:
an image database configured to store images associated with at least two devices;
a device database configured to store a role of each of the at least two devices;
a processor configured to:
identify a patching template for interconnection of the at least two devices based on the role of each of the at least two devices;
identify and group available logical ports on each of the at least two devices based on information retrieved from the device database;
extract the stored images from the image database and populate a respective one of the images with the identified available logical ports; and
generate a network patch plan to interconnect the at least two devices using the identified available logical ports based on the identified patching template, the role of the at least two devices, and the grouping of available logic ports.

18. The system of claim 17, wherein the processor is further configured to select a link type for each of the logical ports, the link type comprising a rule to confirm a valid interconnection of the identified available logical ports of the at least two devices.

19. The system of claim 17, wherein the processor is further configured to associate a port type with each of the respective logical ports, the port type indicative of the communication protocol over which the respective logical ports communicate.

20. The system of claim 17, wherein the processor is further configured to identify similar logical ports of the at least two devices and group the similar logic ports in a same group.

* * * * *